United States Patent

[11] 3,579,204

[72] Inventor Andrew James Lincoln
Concord, Mass.
[21] Appl. No. 809,899
[22] Filed Mar. 24, 1969
[45] Patented May 18, 1971
[73] Assignee Sperry Rand Corporation

[54] VARIABLE CONDUCTION THRESHOLD TRANSISTOR MEMORY CIRCUIT INSENSITIVE TO THRESHOLD DEVIATIONS
5 Claims, 2 Drawing Figs.

[52] U.S. Cl. .......... 340/173, 307/238, 307/242, 307/279
[51] Int. Cl. .......... G11c 11/40
[50] Field of Search .......... 340/173; 307/238, 242, 279

[56] References Cited
UNITED STATES PATENTS 3,508,211 4/1970 Wegener .......... 340/173
3,518,635 6/1970 Cole .......... 340/173

*Primary Examiner*—Terrell W. Fears
*Attorney*—S. C. Yeaton

ABSTRACT: A memory circuit for application in a computer memory for storing a binary valued digit. The circuit comprises two insulated gate field effect transistors characterized by electrically controllable conduction thresholds established by potentials applied between the respective gate electrodes and substrates. A binary digit is stored by establishing a difference in threshold between the two transistors and is read by sensing the difference in current flow therebetween in response to an interrogation potential applied to the gate electrodes thereof. The binary value ONE or ZERO is stored by establishing a higher threshold for one transistor with respect to the other or for the other transistor with respect to the one.

INVENTOR
ANDREW JAMES LINCOLN
BY
HP Terry
ATTORNEY

INVENTOR
ANDREW JAMES LINCOLN
BY
H P Terry
ATTORNEY

VARIABLE CONDUCTION THRESHOLD TRANSISTOR MEMORY CIRCUIT INSENSITIVE TO THRESHOLD DEVIATIONS

BACKGROUND OF THE INVENTION

1. Field of the Invention

The invention pertains to computer memory elements of the type comprising semiconductor devices having the characteristics of electrical alterability and nondestructive readout (NDRO).

2. Description of the Prior Art

Copending application Ser. No. 648,414, filed June 23, 1967, now U.S. Pat. No. 3,508,211 for "Electrically Alterable nondestructive Readout Field Effect Transistor Memory" in the name of Horst A. R. Wegener and assigned to the present assignee discloses a matrix of variable conduction threshold transistor memory elements. Each element is comprised of a variable threshold transistor whose conduction threshold is electrically alterable by impressing a binary polarity voltage between the gate electrode and the substrate in excess of a predetermined finite magnitude. The polarity of the voltage determines the sense in which the threshold is varied. Upon the application to the gate electrode of a fixed interrogation voltage having a value intermediate the binary valued conduction thresholds, the binary condition of the transistor can be sensed by monitoring the magnitude of the resulting current between the source and drain. The amplitude of the interrogation voltage is insufficient to change the preexisting conduction threshold so that nondestructive readout is achieved.

One of the outstanding advantages of the variable threshold memory element is that it is completely compatible with the use of integrated microelectronic circuit fabrication techniques and devices in digital computers.

A computer memory might normally include semiconductor slices each containing large numbers of transistor memory elements. It has been observed in the manufacture of such semiconductor slices that the threshold characteristics of transistors located remotely from one another on a slice may tend to be different from one another whereas proximate transistors on the slice tend to exhibit similar threshold characteristics.

An interrogation potential proper to distinguish between binary valued thresholds established for one transistor on a slice may not so distinguish for a remotely locating transistor on the same slice.

SUMMARY OF THE INVENTION

It is the primary object of the present invention to provide memory elements comprising variable threshold transistors, which elements are insensitive to deviations of the threshold characteristics of transistors over a semiconductor slice.

This object is accomplished by providing a memory element comprising two variable threshold transistors located in proximity to one another on a semiconductor slice. A binary digit is stored by establishing a difference in threshold between the two transistors and is read by sensing the difference in current flow therebetween in response to an interrogation potential applied to the gate electrodes thereof. The binary value ONE or ZERO is stored by establishing a higher threshold for one transistor with respect to the other or for the other transistor with respect to the one, respectively. The binary values are distinguished one from the other by detecting which of the two transistors is conducting the larger current.

Distinguishing between the binary valued states of the element depends therefore on the difference in thresholds established between two proximate transistors on a slice having similar threshold characteristics rather than on the magnitude of the thresholds actually established.

Consequently, the memory element in accordance with the present invention is insensitive to deviations of the threshold characteristics of the transistors over a semiconductor slice.

DESCRIPTION OF THE PREFERRED EMBODIMENT

Figure 1:
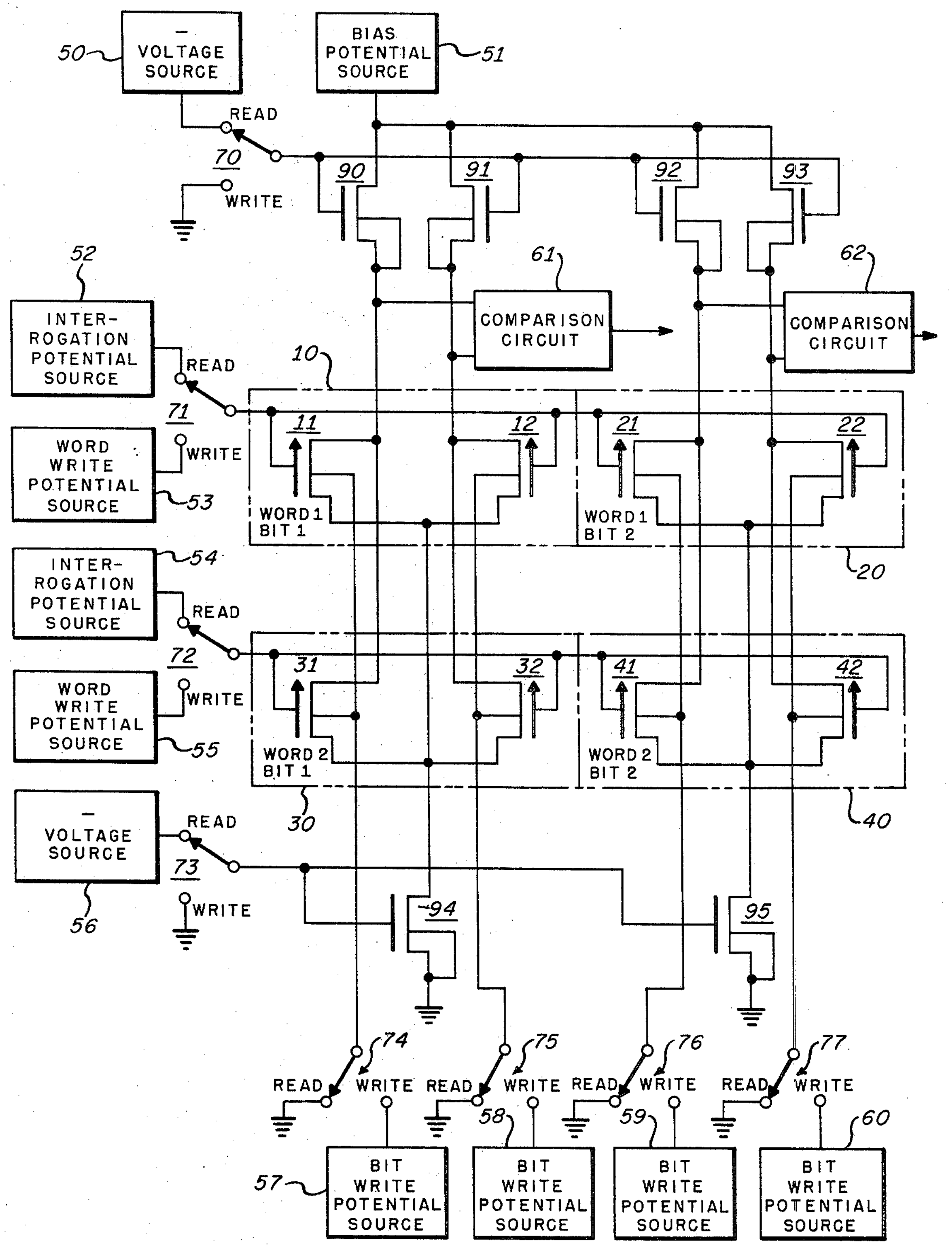
FIG. 1 is a schematic wiring diagram of a word-organized memory having provision for two words of two bits each equipped with the memory element of the present invention.

Referring to FIG. 1, four memory circuits 10, 20, 30 and 40 of the present invention are provided in a word-organized memory for the storage of two words of binary data, each consisting of two bits, by way of example. Each memory circuit is comprised of two variable conduction threshold field effect transistors. The variable threshold characteristic is indicated by the arrowhead on the gate electrode symbol. The memory circuit 10 comprises transistors 11 and 12; the memory circuit 20 comprises transistors 21 and 22; the memory circuit 30 comprises transistors 31 and 32 and the memory circuit 40 comprises transistors 41 and 42. The memory circuits 10 and 20 represent bits 1 and 2 respectively of word 1 and the memory circuits 30 and 40 represent bits 1 and 2 respectively of word 2.

Biasing potentials such as DC voltages are provided to the variable threshold transistors by means of a biasing potential source 51 via the drain and source electrodes of fixed threshold field effect transistors 90 through 93 inclusive. The biasing potential provided via the transistor 90 is applied to the drain electrodes of the transistors 11 and 31 and in the biasing potential provided via the transistor 91 is applied to the drain electrodes of the transistors 12 and 32. The biasing circuits therefor are completed by connecting the source electrodes of the transistors 11, 12, 31 and 32 to the grounding terminal via the drain and source electrodes of a transistor 94. In a similar manner, the transistors 92, 93 and 95 provide the biasing circuits for the transistors 21, 22, 41 and 42.

The substrates of the transistors 90 through 95 inclusive are connected to their respective source electrodes. The transistor 90 functions as the drain load resistor for the transistors 30 and 31. In a similar manner, the transistors 91 through 93 function as the drain load resistors for the transistors 12 and 32, 21 and 41, 22 and 42, respectively.

The biasing potentials are applied to the memory circuits during the interrogation procedure and are removed for the purpose of writing into the memory. A voltage source 50 connected via a switch 70 to the gate electrodes of the transistors 90 through 93 and a voltage source 56 connected via a switch 73 to the gate electrodes of the transistors 94 and 95 control the application and removal of the biasing potentials in a manner to be explained.

Figure 2:
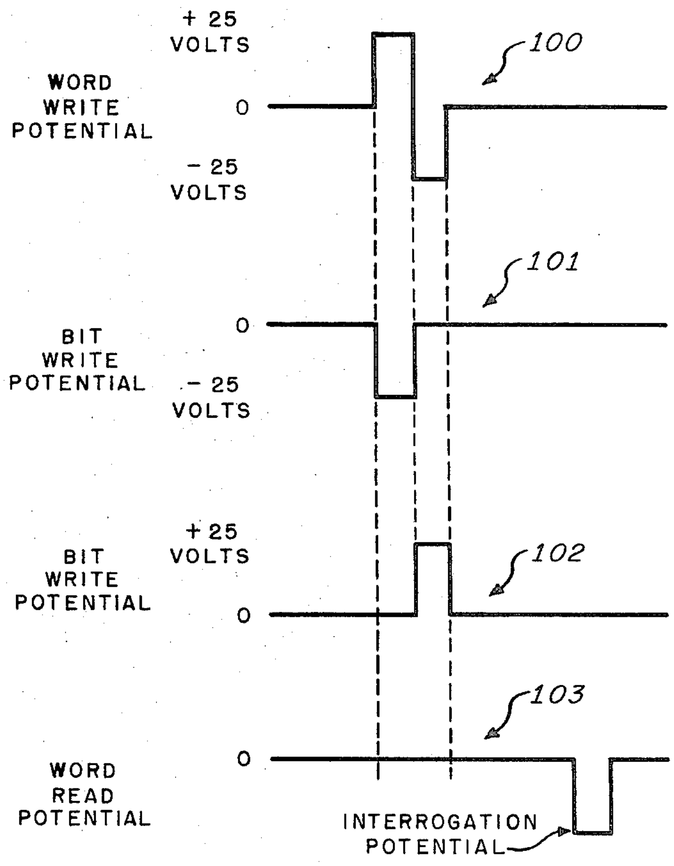
FIG. 2 is a waveform diagram showing the waveforms provided by the potential sources of FIG. 1

Potentials for writing into the memory are provided by potential sources 53, 55, 57, 58, 59 and 60. The word-write potential source 53 is connected via a read-write switch 71 to the gate electrodes of the transistors 11, 12, 21 and 22. The potential source 53 provides, in a conventional manner, a voltage selectively having a waveform 100 as illustrated in FIG. 2 or ground potential. The word-write potential source 55 is connected via a read-write switch 72 to the gate electrodes of the transistors 31, 32, 41 and 42 for providing voltages similar to those provided by the potential source 53. The bit-write potential source 57 is connected via a read-write switch 74 to the substrates of the transistors 11 and 31. In a similar manner, the bit-write potential sources 58—60 are connected via read-write switches 75 through 77 respectively to the substrates of the transistors 12 and 32, 21 and 41, 22 and 42, respectively. The bit-write potential sources 57 through 60 selectively provide, in a conventional manner, either voltage waveforms 101 or 102 as illustrated in FIG. 2. The voltages provided by the potential sources 53 and 55 are combined with the voltages provided by the potential sources 57 through 60 to write binary data into the memory elements, in a manner to be described later.

The voltages for interrogating the memory are provided by interrogation potential sources 52 and 54. The potential source 52 is connected via the read-write switch 71 to the gate electrodes of the transistors 11, 12, 21 and 22. The potential source 54 is connected via the read-write switch 72 to the gate electrodes of the transistors 31, 32, 41 and 42. The interrogation circuits are completed by connecting the substrates of the transistors 11 and 31 to the grounding terminal via the read-write switch 74 and similarly connecting the substrates of the transistors 12 and 32, 21 and 41, 22 and 42, to the grounding terminal via the read-write switches 75, 76 and 77, respectively.

The interrogation potential sources 52 and 54 provide voltages selectively having a waveform 103 as illustrated in FIG. 2 or ground potential. The value of the interrogation potential is selected in a manner to be explained.

A comparison circuit 61 is connected to the source electrodes of the transistors 90 and 91 and a comparison circuit 62 is similarly connected to the transistors 92 and 93. The comparison circuits 61 and 62 compare the currents flowing through the respective source and drain electrodes of the two transistors comprising each memory circuit 10, 20, 30 and 40. For example, the comparison circuit 61 may compare the respective currents flowing through the transistors 11 and 12 and the comparison circuit 62 might compare the respective currents flowing through the transistors 21 and 22. The comparison circuits 61 and 62, may, for example, be difference amplifiers. The comparison circuits 61 and 62 cooperate with the interrogation potential sources 52 and 54 to detect the binary values of digits stored in the memory circuits 10, 20, 30 and 40, in a manner to be more fully explained hereafter.

The transistors of a memory of the type exemplified in FIG. 1 are fabricated on a single slice of semiconductor material. Transistors located with respect to one another at remote positions on the slice may exhibit different threshold characteristics from each other whereas proximate transistors tend to exhibit similar threshold characteristics. The two transistors comprising each memory circuit on the slice are chosen adjacent one another.

The threshold differences associated respectively with the pairs of transistors comprising the memory circuits on the slice are established to exceed a predetermined value although the actual threshold values established may differ for memory circuits located remotely from one another. Consequently, a predetermined minimum current difference is established for every interrogated transistor pair on the slice, this minimum current difference selected to have sufficient magnitude to permit comparison circuits 61 and 62 to distinguish between the binary ONE and the binary ZERO states defined by the current difference.

The predetermined minimum threshold difference is established by the proper selection of the magnitudes for the writing potentials 100 through 102 which are illustrated in FIG. 2 and are provided by the write-potential sources 53, 55, 57, 58, 59 and 60.

In order that the predetermined minimum current difference is actually established for every interrogated transistor pair on the slice, the magnitude of the interrogated potential 103 as illustrated in FIG. 2 and provided by the interrogation potential sources 52 and 54 is chosen sufficiently large so that at least one transistor of every pair will conduct the predetermined minimum current in response to the interrogation potential. The magnitude of the interrogation voltage must be chosen less than ±25 volts so as not to alter established thresholds during the interrogation of the memory. Typically, this potential is approximately −15 volts.

The operation of the memory represented in FIG. 1 will be explained by means of an example in which the binary digits ZERO and ONE are to be written into the memory circuits 10 and 20, respectively. The memory circuits 10 and 20 represent bits 1 and 2 of word 1 respectively. Subsequent to writing, word 1 of the memory is to be interrogated and the binary values ZERO and ONE to be detected by the comparison circuits 61 and 62, respectively. The binary data stored in the bits 1 and 2 of word 2 are to remain unaffected.

The conduction thresholds for typical variable threshold transistors may vary between approximately −2 volts and −12 volts. More negative thresholds are established by negative potentials having values between approximately −25 volts and −50 volts applied between the gate electrodes and the substrates. Less negative thresholds are established by positive potentials having values between approximately +25 volts and +50 volts applied therebetween. Positive potentials less positive than approximately +25 volts or negative potentials less negative than approximately −25 volts are uneffective in altering the conduction thresholds of the transistors.

An interrogation potential applied to the gate electrodes less negative than the established thresholds, will be insufficient to turn on the transistors (e.g., cause current to flow from source to drain). An interrogation potential, however, more negative than the established thresholds is effective to establish currents flowing through the respective transistors proportional to the differences in potential between the interrogation voltage and the established thresholds.

The memory is conditioned for writing by setting the switches 70 through 77 to the "write" position. The gate electrodes of the fixed threshold transistors 90 through 95 are thereby connected to ground potential rendering these transistors nonconductive. The biasing circuits are therefore decoupled from the variable threshold transistors.

The binary values ZERO and ONE are written respectively into the memory circuits 10 and 20 by adjusting the word-write potential source 53 to provide the potential 100 illustrated in FIG. 2 and by adjusting the word-write potential source 55 to provide ground potential. Furthermore, the bit-write potential sources 57 through 60 are adjusted to provide the potentials 102, 101, 101 and 102 respectively. Consequently, a −50-volt potential is applied between the gate electrode and the substrate of the transistor 11 and a +50-volt potential is applied between the gate electrode and the substrate of the transistor 12. A more negative threshold is thus established for transistor 11 than for transistor 12. This relative threshold relation defines the binary ZERO state for the memory circuit 10. Similarly, a more negative threshold is established for the transistor 22 than for the transistor 21 thus defining the binary ONE state for the memory circuit 20. Since potentials not exceeding ±25 volts are applied between the gate electrodes and substrates of the transistors 31, 32, 41 and 42, respectively, the existing thresholds stored therein remain undisturbed.

The memory is now conditioned for interrogation by setting the switches 70 through 77 to the "read" position. Consequently, the gate electrodes of the fixed threshold transistors 90 through 93 are connected to the potential source 50 and the gate electrodes of the fixed threshold transistors 94 and 95 are connected to the potential source 56. The transistors 90 through 95 are thereby rendered conductive coupling the biasing circuits to the variable threshold transistors.

Word 1 of the memory is interrogated by adjusting the interrogation potential source 52 to provide the potential 103 illustrated in FIG. 2 and by adjusting the interrogation potential source 54 to provide ground potential. As a result, a larger current will flow through the transistor 12 than through the transistor 11 and a larger current will flow through the transistor 21 than through the transistor 22 due to the respective thresholds established therefor. Thus, the comparison circuit 61 (a difference amplifier, for example) will provide an indication representative of the binary ZERO state and the comparison circuit 62 (similarly exemplified by a difference amplifier) will provide a different indication than comparison circuit 61, this different indication representative of the binary ONE state. Current flow will not be established through the transistors 31, 32, 41 and 42 thus not providing any contribution to the output indications of the comparison circuits 61 and 62.

The particular potentials specified hereinabove are chosen for a memory configuration comprising *p*-channel enhancement mode transistors, by way of example. Different polarities and magnitudes for the potentials may be required for other types of transistors.

While the invention has been described in its preferred embodiment, it is to be understood that the words which have been used are words of description rather than limitations, and that changes may be made without departing from the true scope and spirit of the invention in its broader aspects.

I claim:

1. A memory circuit comprising first and second variable threshold transistor means having source, drain and gate electrodes formed on substrates, respectively, said transistor means having electrically controllable conduction thresholds established by potentials having values above a certain magnitude applied between said gate electrodes and said substrates, writing means for applying a first potential between said gate electrode and said substrate of said first transistor means having a value above said magnitude to establish a first conduction threshold therefor, and for applying a second potential between said gate electrode and said substrate of said second transistor means having a value above said magnitude to establish, for said second transistor means, a second conduction threshold different from said first conduction threshold, reading means for applying an interrogation potential to said gate electrodes of said first and second transistor means having a value below said magnitude, biasing means for biasing said source and drain electrodes of said first and second transistor means, and comparison means for comparing the current flowing through said source and drain electrodes of said first transistor means with the current flowing through said source and drain electrodes of said second transistor means in response to said interrogation potential.

2. A memory circuit of the character recited in claim 1 wherein the difference between said thresholds is sufficient to enable current flow through said source and drain electrodes of said first transistor means to differ from current flow through said source and drain electrodes of said second transistor means by at least a predetermined amount when both said transistor means are conducting.

3. A memory circuit of the character recited in claim 2 wherein said value of said interrogation potential is effective to establish current flow of at least said predetermined amount through the source and drain electrodes of one of said transistor means when said first and second thresholds are established.

4. A memory circuit of the character recited in claim 3 wherein said writing means is adaptable for applying said first and second potentials to said first and second transistor means respectively or to said second and first transistor means respectively, to selectively enable current flow through said first or second transistor means to exceed current flow through said second or first transistor means respectively by said predetermined amount in response to said interrogation potential.

5. A memory circuit of the character recited in claim 4 in which said first and second transistor means are fabricated on a slice of semiconductor material, said memory circuit further includes a plurality of pairs of variable threshold transistor means fabricated on said slice, and said memory circuit also includes additional writing means, reading means, biasing means and comparison means for providing respectively writing potentials, interrogation potentials, biasing potentials and comparison functions for said pairs of variable threshold transistor means.